United States Patent [19]

Henley

[11] Patent Number: 5,657,073
[45] Date of Patent: Aug. 12, 1997

[54] SEAMLESS MULTI-CAMERA PANORAMIC IMAGING WITH DISTORTION CORRECTION AND SELECTABLE FIELD OF VIEW

[75] Inventor: Stuart L. Henley, Calgary, Canada

[73] Assignee: Panoramic Viewing Systems, Inc., Edmonton, Canada

[21] Appl. No.: 458,060

[22] Filed: Jun. 1, 1995

[51] Int. Cl.$^6$ .............................. H04N 7/18; H04N 13/02
[52] U.S. Cl. .............................................................. 348/38
[58] Field of Search .................................. 348/38, 36, 39, 348/37, 60; 354/94; H04N 7/18

[56] References Cited

U.S. PATENT DOCUMENTS

| | | | |
|---|---|---|---|
| 4,890,314 | 12/1989 | Judd et al. | 348/14 |
| 5,067,019 | 11/1991 | Juday et al. | 348/580 |
| 5,130,794 | 7/1992 | Ritchey | 348/39 |
| 5,185,667 | 2/1993 | Zimmerman | 348/36 |
| 5,187,571 | 2/1993 | Braun et al. | 348/39 |
| 5,200,818 | 4/1993 | Neta et al. | 348/39 |
| 5,313,306 | 5/1994 | Kuban et al. | 348/65 |
| 5,359,363 | 10/1994 | Kuban et al. | 348/36 |
| 5,444,478 | 8/1995 | Lelong et al. | 348/39 |

OTHER PUBLICATIONS

"See You Around" by Tom Halfhill—BYTE Magazine May 1995 pp. 85–90; Printed in USA.

Primary Examiner—Amelia Au
Assistant Examiner—Bryan S. Tung
Attorney, Agent, or Firm—Don Halgren

[57] ABSTRACT

An imaging system for the production of panoramic or panospheric output images in still or video formats, by seamlessly merging an arbitrary number of simultaneous, overlapping input images which collectively encompass an entire field of view. The system includes a plurality of cameras which direct multiple simultaneous streams of analog or digital input into an image transformation engine, to process those streams to remove distortion and redundant information, creating a single output image in a cylindrical or spherical perspective. The output image signal is directed through an image clipping system, which acts under the control of a pan-flit-rotation-zoom controller to select a portion of the panoramic or panospheric image for display on a monitor, screen or headset.

6 Claims, 3 Drawing Sheets

5,657,073

SEAMLESS MULTI-CAMERA PANORAMIC IMAGING WITH DISTORTION CORRECTION AND SELECTABLE FIELD OF VIEW

(1) BACKGROUND OF THE INVENTION

This invention relates to an imaging system for the production of a panoramic or panospheric image by the seamless merging of an arbitrary number of simultaneous overlapping images which collectively comprise a hemispherical or greater field of view.

(2) PRIOR ART

There exists of a number of arrangements for combining multiple still photographs and digital still images of a particular scene into a single seamless wide angle panoramic photograph or digital image. One of the systems is known as Apple Corporation's Quick Time VR which was adapted to create panoramas without the need for helmets, goggles, or gloves in a virtual reality world. The Apple system utilizes a camera to shoot a panorama by way of multiple images taken as the camera is rotated around the nodal point (i.e., the optical center) of the lens, and wherein the frames of the photos overlap slightly. Software called a "stitcher" automatically joins the individual photos together to make a seamless 360 degree view. A coherent panoramic image is created on a cylindrical perspective.

There are arrangements for remapping collective images, so that certain input pixels of an input image transform to a portion of an output image, as is shown in U.S. Pat. No. 5,067,019 to Juday, et at. This remapping transformation may be utilized for a stretch of an image to an enlarged output image about a central location or for the compression of certain input images to a central output image. U.S. Pat. No. 5,185,667 to Zimmermann discloses an arrangement for providing perspective corrected views of selected portions of a hemispherical view utilizing no moving parts. This device uses an effect produced from a fish eye lens, which produces a circular image of an entire hemispherical field-view, which can be mathematically corrected using electronic circuitry. U.S. Pat. No. 5,313,306 to Kuban et el. shows an arrangement for providing perspective and distortion corrected views of a selected portion of a field of view using a motionless camera and endoscopy system. It is the electronic equivalent of a mechanical pan, tilt, zoom, and rotation camera viewing system with no moving mechanisms. It is typically utilized for external or internal imaging for industrial inspection in combination with a video camera attached to a medical device such as a laparoscope, cystoscope, or other like device. U.S. Pat. No. 5,359,363, also to Kuban et al., shows a further system for providing perspective and distortion corrected views of a selected portion of a field of view.

However, no system has been shown to process multiple streams of simultaneous digital or analog video input, each capturing a particular or unique field of view, and transforming that plurality of images into a single seamless real time panoramic or panospheric video output.

It is an object of the present invention to be able to present stereoscopic information from such multiple streams of simultaneous digital or analog video input, each stream capturing such a unique field of view, by digitally separating the overlapping images and thereafter presenting that view to the separate eyes of an observer.

It is a further object of the present invention to provide a system to process such multiple streams of digital or analog video input received in an simultaneous impression, and each stream capturing a particular field of view, which combination is combinable into a single seamless real time panoramic or panospheric video output.

BRIEF SUMMARY OF THE INVENTION

The present invention comprises an imaging system which is arranged to produce a panoramic or panospheric output image in either a still or a video format, by seamlessly merging a plurality of simultaneous, overlapping input images, which images collectively represent an entire field of view. The imaging system includes a plurality of cameras having proper output circuitry which directs multiple simultaneous streams of digital or analog input into an image transformation system, such as recited in U.S. Pat. Nos. 5,185,667; 5,313,306; or 5,359,363, which are incorporated herein by reference, in their entirety. Such image transformation systems digitally process multiple streams of digital or analog input to remove distortion and redundant information, to create a single output image in a cylindrical or spherical configuration. The combined output from the plurality of cameras is directed through an image clipping system, which image clipping system is under the control of a pan-tilt-rotation-zoom (PTRZ) controller which selects a portion of the panoramic or panospheric view for display on a monitor, a virtual reality headset, or onto a projective display screen or the like. A further co-pending application, Ser. No. 08/422,217, filed Apr. 14, 1995, entitled "Panoramic Viewing System", is also incorporated herein by reference, in its entirety.

The imaging system of the present invention comprises a plurality of video cameras arranged in a spaced apart, radially directed array, so as to collectively capture a panoramic or panospheric field of view. The imaging system also includes the means to direct each stream of digital or analog output simultaneously, into an image transformation engine. The image transformation engine processes the collection of signals, so as to remove any distortion created by the image capture process, to seamlessly merge those multiple images of adjacent cameras, by removing redundant pixels recorded in overlapping fields of view, so as to generate a single stream of digital or analog video output of a wide angle scene, and direct it to an image clipper. The image clipper acts under the control of a pan-tilt-rotation-zoom controller to select a portion of the image for display onto a display device such as a monitor, a virtual reality helmet, or a projective display for viewing the image.

In a further embodiment of the present invention, a means is provided where pixels from overlapping adjacent fields of view may be digitally separated and directed to separate circuits to individual display devices to provide stereoscopic viewing of those overlapping regions.

The invention thus comprises an imaging system for the production of a panoramic or a panospheric output image using the simultaneous seamless merging of a plurality of overlapping input images to collectively display an entire field of panoramic view, comprising; a plurality of cameras mounted so as to collectively capture the panoramic or panospheric field of view; a means to direct the simultaneous streams of digital or analog output from each of the cameras, into an image transformation engine; the image transformation engine being arranged to process digital or analog signals so as to remove distortions generated by the image capture process, so as to seamlessly merge the images from adjacent cameras, and to create a single output stream of digital or analog video; a means to direct the output stream of analog or digital video to an image clipper; a pan-tilt-rotation-zoom controller arranged to control the image clipper to select a portion of the image for display; and a display device for viewing the output image of the image clipper.

At least a portion of the collective field of view photographed is overlapping, and the image transformation engine provides therefor, a digital separation of redundant pixels into at least two separate output streams, each of the output streams being directed to a separate eye of an observer, so as to provide stereoscopic viewing of the overlapping regions.

At least a portion of the collective field of view is in an overlapping arrangement, and in which the image transformation engine also provides a digital separation and a coloration of redundant pixels in a single output stream, the output stream being directed through a translucent color filter arrangement to the separate eyes of an observer so as to permit stereoscopic viewing of the overlapping regions. The displayed device may be selected from the group comprising a monitor, television, virtual reality helmet, or projective display.

The invention also comprises a process for the seamless display of a plurality of images, all of which have an overlapping field of view between adjacent images, the process comprising: arranging a plurality of cameras so as to collectively capture a panoramic or panospheric field of view; directing a stream of output from each of the cameras into an image transformation engine; removing distortions introduced by the image capturing process in the image transformation engine; removing redundant pixels to seamlessly merge the images and subsequently outputting a single stream of digital or analog video from the engine; directing the output stream of digital or analog video to an image clipper; controlling the image clipper by a pan-tilt-rotation-zoom controller to select a portion of the image display; and displaying the image for viewing thereof. The process also includes the steps of: separating digitally, redundant pixels of the output streams into two separate viewable output streams, and directing each of the two separate viewable output streams to the separate eyes of an observer to permit stereoscopic viewing of the overlapping regions, and directing each of the two separate viewable output streams from the collective overlapping field of view through translucent color filters to separate eyes of an observer to permit stereoscopic viewing of the overlapping regions.

BRIEF DESCRIPTION OF THE DRAWINGS

The objects and advantages of the present invention will become more apparent, when viewed in conjunction with the following drawings, in which.

DETAILED DESCRIPTION OF THE PREFERRED EMBODIMENTS

The present invention shows an imaging system having a plurality of video cameras arranged around a common locus so as to collectively capture a panoramic or panospheric field of view, together with a means to direct such multiple streams of digital or analog output simultaneously, into an image transformation engine. The image transformation engine processes the signals so as to remove distortions generated by the image capturing process.

This system is utilized to merge the images by removing redundant pixels which are found in the overlapping fields of view as photographed between adjacent cameras, and to output a signal scene of digital or analog video of the wide angle scene to an image clipper. The image clipper which operates under the control of a pan-tilt-rotation-zoom controller, selects a portion of the image display. The display may then be shown on a monitor such as television, a virtual reality helmet, or a projective display device for viewing the image.

Figure 1:
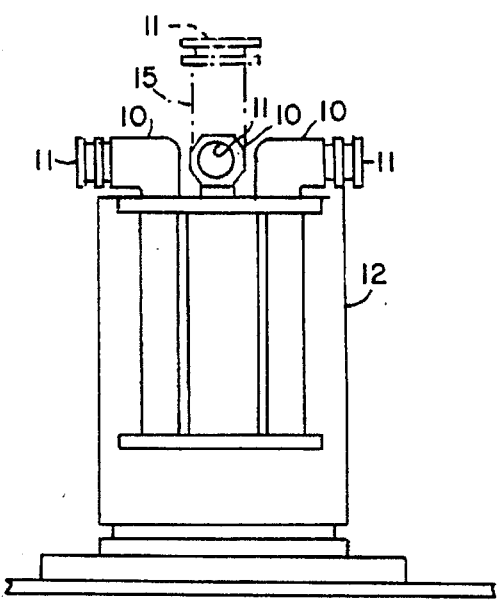
FIG. 1 is a side elevational view, partly in section, showing a multiple camera assembly arrangement which is configured to capture a panoramic field of view.

The multi camera assembly 10, shown in FIG. 1, which in this example utilizes four cameras, only three being shown here for clarity of view, each with a lens assembly 11, are mounted within a housing 12, wherein the field of view of all of the cameras collectively capture is a complete 360 degree panoramic field of view. A fifth camera, shown in dashed lines 15, in FIG. 1, having a field of view orthogonal to the other four cameras, may be added to capture a panospheric field of view. This arrangement of cameras may be comprised of as few as two cameras, each fitted with a "fish eye" lens or may be arranged with five cameras each looking radially outwardly from a common point.

Figure 2:
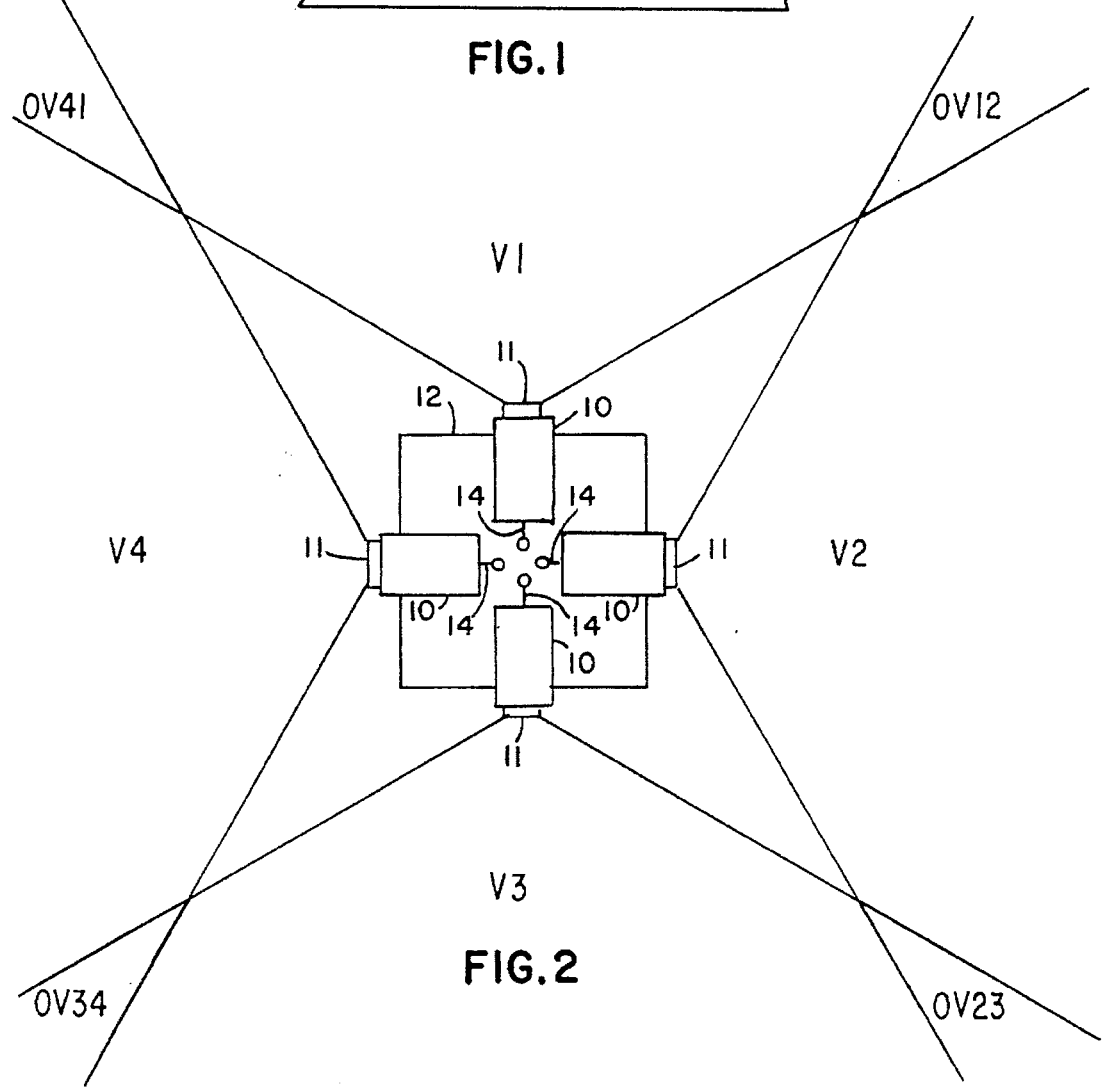
FIG. 2 is a schematic representation of the multi cameras shown in FIG. 1, showing the fields of view as well as the overlapping fields of view therebetween.
Figure 2A:
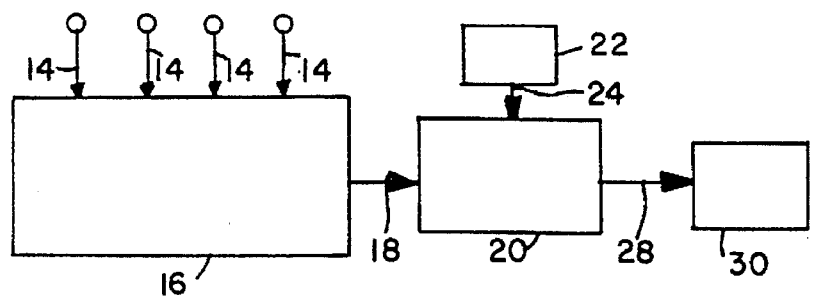
FIG. 2A is a further schematic representation of the imaging system to that shown in FIG. 2.

The schematic representation of the imaging system shown in FIG. 2, shows the output data streams 14 from each of the multi cameras 10, mounted within the housing 12, shown in FIG. 1. Each particular camera captures a field of view V1, V2, V3, and V4 with overlapping fields of view OV12, OV23, OV34, and OV41. All of these fields V1, V2, V3, and V4 are directed into a proper image transformation system or engine 16, as identified hereinabove. The image transformation engine 16 is arranged to properly process and remove distortion from the images 14 it receives from each of the cameras 10, and to merge such input signals, to create a single seamless output data stream 18 which represents a single image of the 360 degree panoramic or panospheric field of view collected by the multiple cameras 10 shown in FIG. 2. The data streams 14, as shown entering the image transformation engine 16, in FIG. 2A, exit as a data stream 18, which is directed into an image clipper device 20, as shown in FIG. 2. The image clipper device 20 is controlled by a pan-tilt-rotation-zoom controller means 22 such as a joy stick controller, a head orientation sensor, or other pointing device. A control signal 24 as the output of controller device 22, selects a portion of the output image 18, for presentation, and is thereupon directed as a presentation image 28, to the display device 30.

Figure 3:
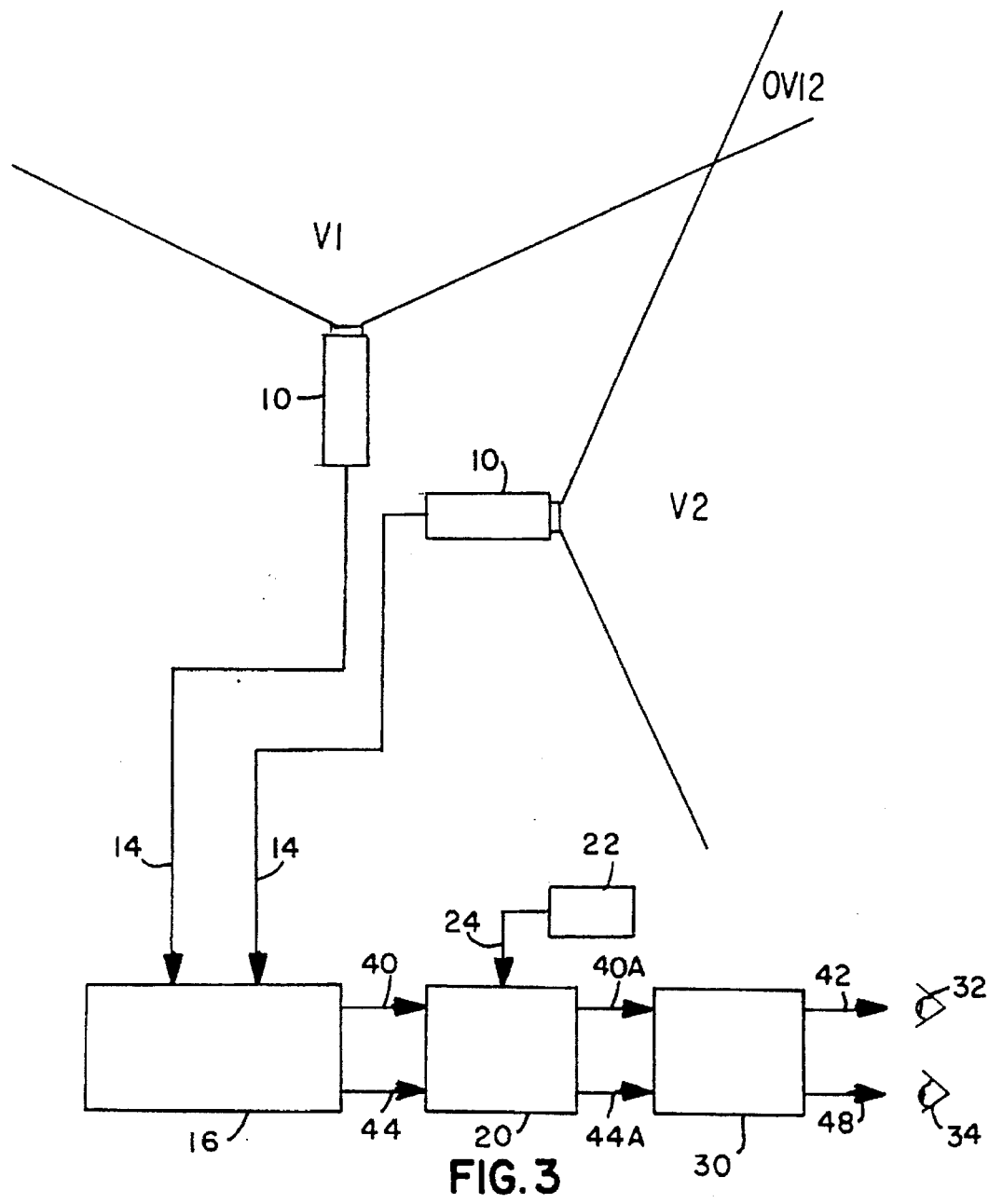
FIG. 3 is a schematic representation of the imaging system showing components of the data processing arrangement for stereoscopic imaging with the system.

The display device 30 may be a monitor, a television, a virtual reality helmet, or other virtual reality display system for mimicking three dimensional viewing, or it may be a projective display. The schematic representation showing the details of the data processing for stereoscopic imaging, represented in FIG. 3, shows a further aspect of the invention by which a means by which the pixels of overlapping fields of view may be digitally separated and provided to separate eyes, so as to provide a stereoscopic viewing of those overlapping images. Thus, in FIG. 3, an overlapping field of view such as OV12 is processed by the image transformation engine 16 such that the pixels from the field V1 enter the output stream 40 and, while under the direction and control of the PTRZ controller 22, a selected portion of the output stream 40A is presented to a first eye 32 as a first radiation beam 42, while the pixels from the field V2 enter the output stream 44 and under the direction of the PTRZ controller 24, a selected portion of that output stream 44A is presented to a second eye 34 as a second radiation beam 48. This gives the observer a perception of the stereoscopic aspects of the field of view OV12 and at the same time providing a wide angle field of view containing both fields VI and V2.

Figure 4:
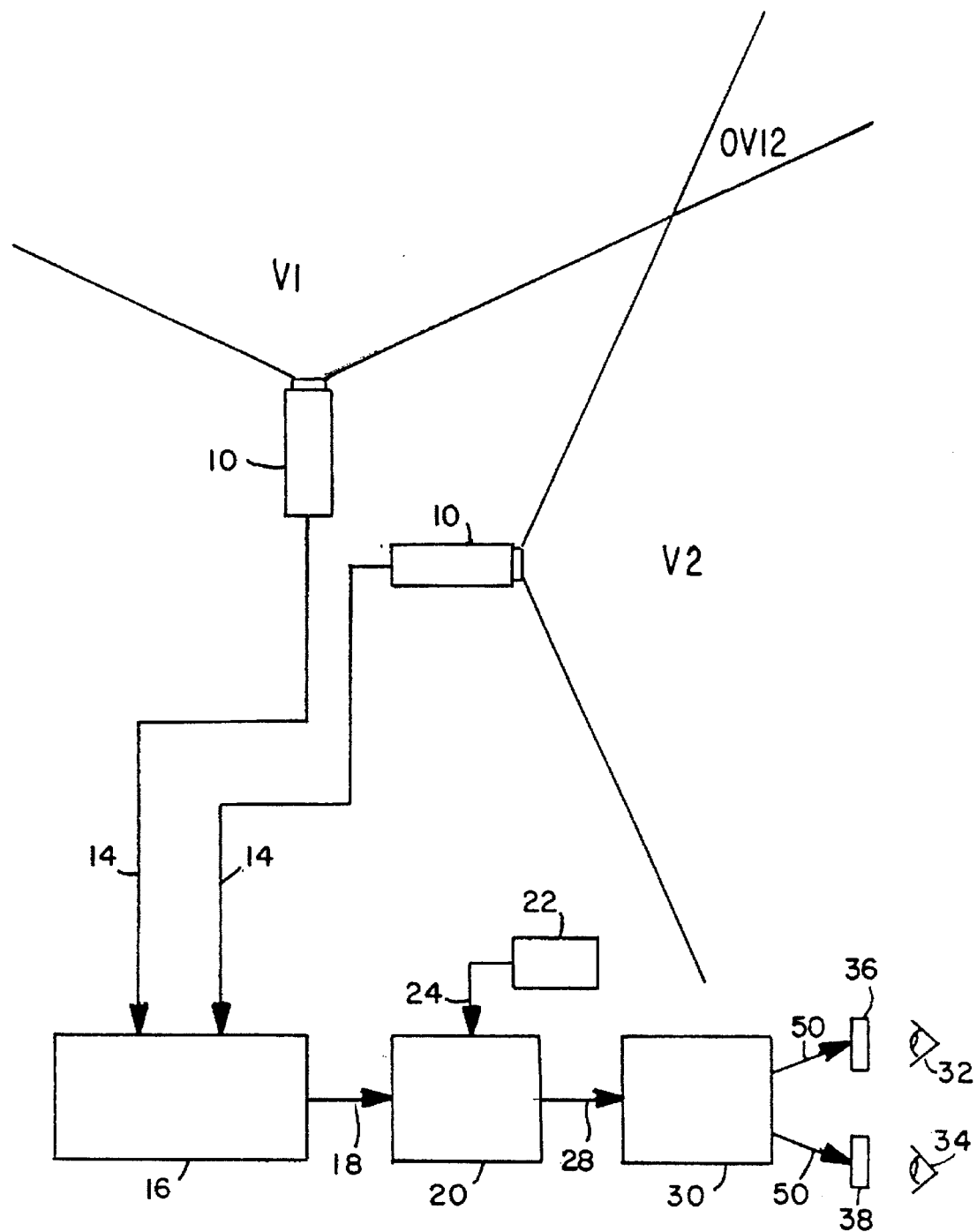
FIG. 4 is a schematic representation of the assembly showing components of a further embodiment of an imaging system for displaying stereoscopic images by the imaging system.

A further embodiment showing the details of achieving a stereoscopic imaging arrangement within the present imaging system, is shown in FIG. 4, wherein an overlapping field of view OV12 is processed by the imaging transformation engine 16 in such a way that pixels from the field V1 are color shifted to tones of color C1 and pixels of field V2 are color shifted to tones of color C2. A single output stream 18 is clipped by the clipping device 20 to generate a presentation stream 28 which is directed to the display device 30. A radiation beam 50 from the display device 30 passes through a color filter 36 which is arranged to block tones of color C1 before entering a first eye 32 and a color filter 38 is arranged to block tones of color C2 before entering a second eye 34, again giving the observer a perception of stereoscopic aspects of the field of view OV12 while at the same time providing a wide angle field of view containing both fields V1 and V2.

I claim:

1. An imaging system for the production of a panoramic or a panospheric output image for the simultaneous seamless merging of a plurality of overlapping input images to collectively display an entire field of panoramic view, comprising;
    a plurality of cameras mounted so as to collectively capture said panoramic field of view;
    a means to direct simultaneous streams of digital or analog output from each of said cameras, into an image transformation engine;
    said image transformation engine arranged to process digital or analog signals so as to remove distortions generated by the image capture process, so as to seamlessly merge the images from adjacent cameras, by removing redundant pixels by digital separation and coloration to create a single output stream of digital or analog video;
    a means to direct said output stream of analog or digital video to an image clipper, including a transparent color filter;
    a pan-tilt-rotation-zoom controller arranged to control said image clipper to select a portion of said panoramic or panospheric image for display; and
    a display device to permit the viewing, by the separate eyes of an observer, of the overlapping regions of an output image of said image clipper.

2. The imaging system as recited in claim 1, wherein at least a portion of the collective field of view is overlapping, and in which said image transformation engine provides a digital separation of redundant pixels into at least two separate output streams, each of said output streams being directed to a separate eye of an observer, so as to provide stereoscopic viewing of overlapping regions.

3. The imaging system as recited in claim 1, wherein said display device may be selected from the group comprising a monitor, television, virtual reality helmet, or projective display.

4. A process for the seamless display of a plurality of images, all of which have an overlapping field of view between adjacent images, said process comprising:
    arranging a plurality of cameras so as to collectively capture a panoramic or panospheric field of view;
    directing a stream of output from each of said cameras into an image transformation engine;
    removing distortions introduced by the image capturing process in said image transformation engine;
    removing redundant pixels to seamlessly merge said images and subsequently outputting a single stream of digital or analog video from said engine;
    directing output stream of digital or analog video to an image clipper;
    controlling said image clipper by a pan-tilt-rotation-zoom controller to select a portion of the merged images;
    color toning each of said separate output streams so that they can be blocked by a translucent color filter arrangement prior to observation thereof;
    directing each of said two separate viewable output streams from the collective overlapping field of view through said translucent color filter arrangement to separate eyes of an observer to permit stereoscopic viewing of overlapping regions; and
    displaying said portion for viewing thereof.

5. The process as recited in claim 4, including the step of:
    separating digitally, redundant pixels of said output stream into two separate viewable output streams.

6. The process as recited in claim 5, including the step of:
    directing each of said two separate viewable output streams to the separate eyes of an observer to permit stereoscopic viewing of overlapping regions.

* * * * *